No. 614,208. F. A. LE COURT. Patented Nov. 15, 1898.
TROLLEY.
(Application filed June 17, 1898.)
(No Model.)
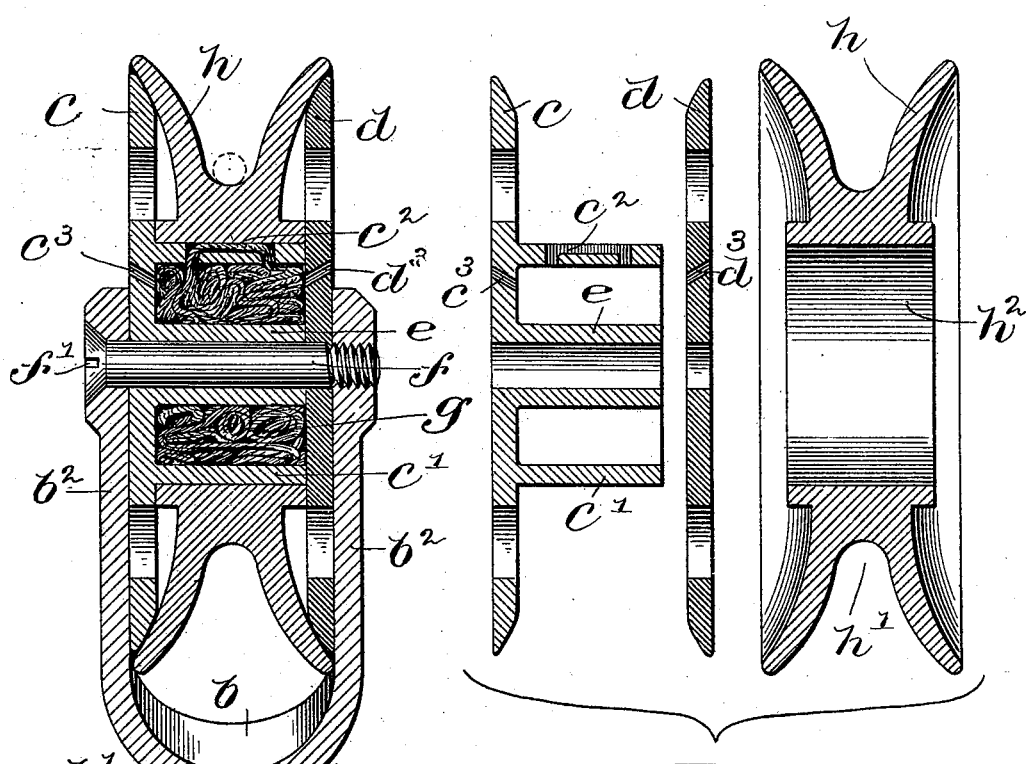
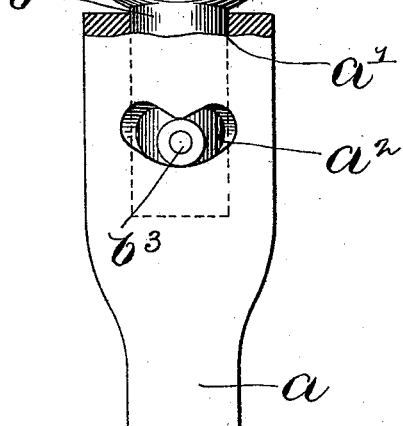
WITNESSES:
Rollin Abell.
P. W. Pezzetti.
INVENTOR:
Francis A. Le Court
by Wright, Brown & Quinby
Attys.
THE NORRIS PETERS CO., PHOTO-LITHO., WASHINGTON, D. C.

UNITED STATES PATENT OFFICE.

FRANCIS A. LE COURT, OF ROCKPORT, MASSACHUSETTS.

TROLLEY.

SPECIFICATION forming part of Letters Patent No. 614,208, dated November 15, 1898.

Application filed June 17, 1898. Serial No. 683,677. (No model.)

*To all whom it may concern:*

Be it known that I, FRANCIS A. LE COURT, of Rockport, in the county of Essex and State of Massachusetts, have invented certain new and useful Improvements in Trolleys, of which the following is a specification.

This invention relates to electric trolleys, and has for its object to increase the life and durability of apparatus of this class.

The invention also has for its object to provide improved means for maintaining the trolley-wheel in a position parallel to the wire in rounding curves, &c.

The invention consists in the novel features of construction and arrangement, which I shall hereinafter describe and claim.

Reference is to be had to the accompanying drawings, in which—

Figure 1 represents a view, partly in section and partly in elevation, showing a trolley constructed in accordance with my invention. Fig. 2 represents a sectional view showing the trolley-wheel and its bearings separated from each other.

The same reference characters indicate the same parts in both figures.

Referring to the drawings, $a$ designates the trolley pole or arm, whose upper end is constructed with a socket $a'$ and a downwardly convex or curved cam-slot $a^2$ in the wall of said socket.

$b$ is a trolley-supporting bracket formed with side arms $b^2 b^2$ and having at its lower end a spindle $b'$, journaled in the socket $a'$ and provided with a roller-stud $b^3$, occupying the slot $a^2$.

$h$ is the trolley-wheel, formed, as usual, with a deep circumferential groove $h'$ to be occupied by the trolley-wire, said trolley-wheel being mounted to rotate in the bracket $b$. The spindle $b'$ of the bracket is adapted to rotate freely in its socket $a'$ within the limits imposed by its slot-and-stud connection with the trolley-pole $a$, and the formation of the slot is such that the stud $b^3$ seeks the lowest point of the slot, by reason of the weight of the bracket and its attachments or by reason of the pressure of the trolley against the wire. The bracket is thus normally held in a central position, but is adapted to turn upon the pole when torsional force is applied, as in rounding curves, so as to maintain the trolley-wheel parallel with the wire, and thus reduce its liability to jump off.

$c$ and $d$ are two radial flanges mounted on either side of the trolley-wheel $h$ between the arms $b^2 b^2$ of the bracket, the flange $c$ being formed with a cylindrical transverse bush $c'$, which abuts against the opposite flange $d$. Said bush forms the shaft or bearing on which the trolley-wheel revolves, and the flanges $c d$ form end bearings for said wheel.

$e$ is a sleeve abutting the flange $d$ and the arm $b^2$ on the opposite side of the bracket, said sleeve constituting the inner wall of a chamber of which the bush $c'$ and the flanges $c d$ constitute the outer and end walls. In this chamber I place a body of absorbent material $g$, such as wicking or cotton-waste, and conduct a portion of the same also through a channel $c^2$, formed in the wall of the bush $c'$. The body of absorbent material $g$ is saturated with lubricating-oil, which is carried by capillarity out of the lubricating-chamber through the channel $c^2$ and thoroughly lubricates the bearing of the trolley-wheel $h$. Small oil-ducts $c^3 d^3$ are formed in the flanges $c d$ and enter the lubricating-chamber for the purpose of supplying oil thereto.

$f$ is a screw-bolt engaged with the arms $b^2 b^2$ of the bracket $b$ and serving to hold the flanges $c d$ and sleeve $e$ stationary in the bracket. Said bolt is shown as formed with a slot $f'$ for the reception of a screw-driver.

The parts are shown separated in Fig. 2, and it becomes apparent that the large central aperture $h^2$ of the trolley-wheel $h$ and the long hub formed thereon give an unusually large bearing, which tends to cause a reduction of wear in the operation of the trolley. I have ascertained by experiment that the life of a trolley of this description is considerably longer than that of the ordinary form.

The trolley-wheel is concave at its ends, so that the flanges $c d$ fit within the cavities, and the edges of the latter bear lightly against the rims, whereby the wheel is held against rocking movement. Besides this, the flanges strengthen the wheel and prevent it from being broken.

The sleeve $e$ could obviously be made integral with either of the flanges $c$ or $d$, though I prefer the construction shown. Various other details of construction and arrangement could also be modified without departing from the spirit of my invention.

Having thus explained the nature of my invention and described a way of constructing and using the same, although without having attempted to set forth all the forms in which it may be embodied or all the modes of its use, I declare that what I claim is—

1. In a device of the character described, the combination of a trolley-wheel, a bracket supporting the same, a trolley-pole, a socket in one of the two last-said members and a stem on the other member occupying said socket, a cam-slot in the wall of the socket, and a stud on the stem, occupying said slot, whereby the bracket and pole are held in connection, the shape of the slot being such as to normally maintain the bracket in a central position and to allow the same to turn when torsional force is applied.

2. In a device of the character specified, the combination of a trolley-bracket, a hollow cylindrical bush held therein, a trolley-wheel mounted to revolve on said bush, side flanges forming an end bearing for said wheel and constituting the end walls of a chamber of which the bush forms the outer wall, a sleeve constituting the inner wall of said chamber, absorbent material occupying the chamber, the bush being formed with an outlet for lubricant contained in the chamber, and a bolt engaged with the sides of the bracket and extending through the sleeve, said bolt holding the flanges, bush, and sleeve in place in the bracket.

3. In a device of the character described, the combination of a trolley-wheel concaved at its ends, a trolley-pole, a bracket mounted on said pole and having provisions for journaling said wheel, said bracket being provided with side flanges fitting within the concaved ends of the wheel, and engaging the rims thereof inside of the outer edges of the latter, substantially as described.

In testimony whereof I have affixed my signature in presence of two witnesses.

FRANCIS A. LE COURT.

Witnesses:
M. B. MAY,
P. W. PEZZETTI.